July 16, 1968    G. VALLETEAU DE MOULLIAC    3,392,850
AUTOMATIC COUPLER HEADS OF REDUCED HEIGHT FOR RAILWAY VEHICLES
Filed April 19, 1966    13 Sheets-Sheet 1

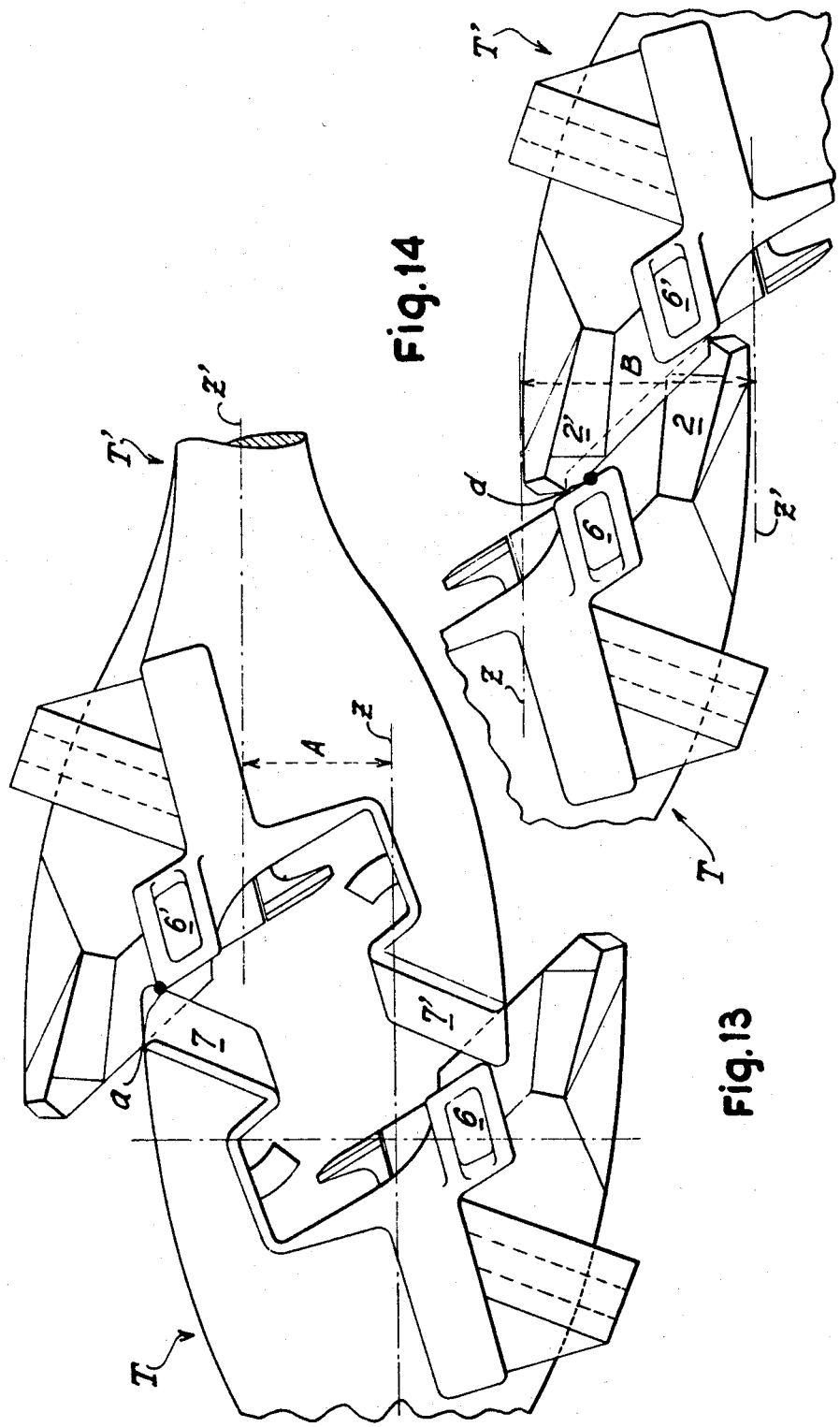

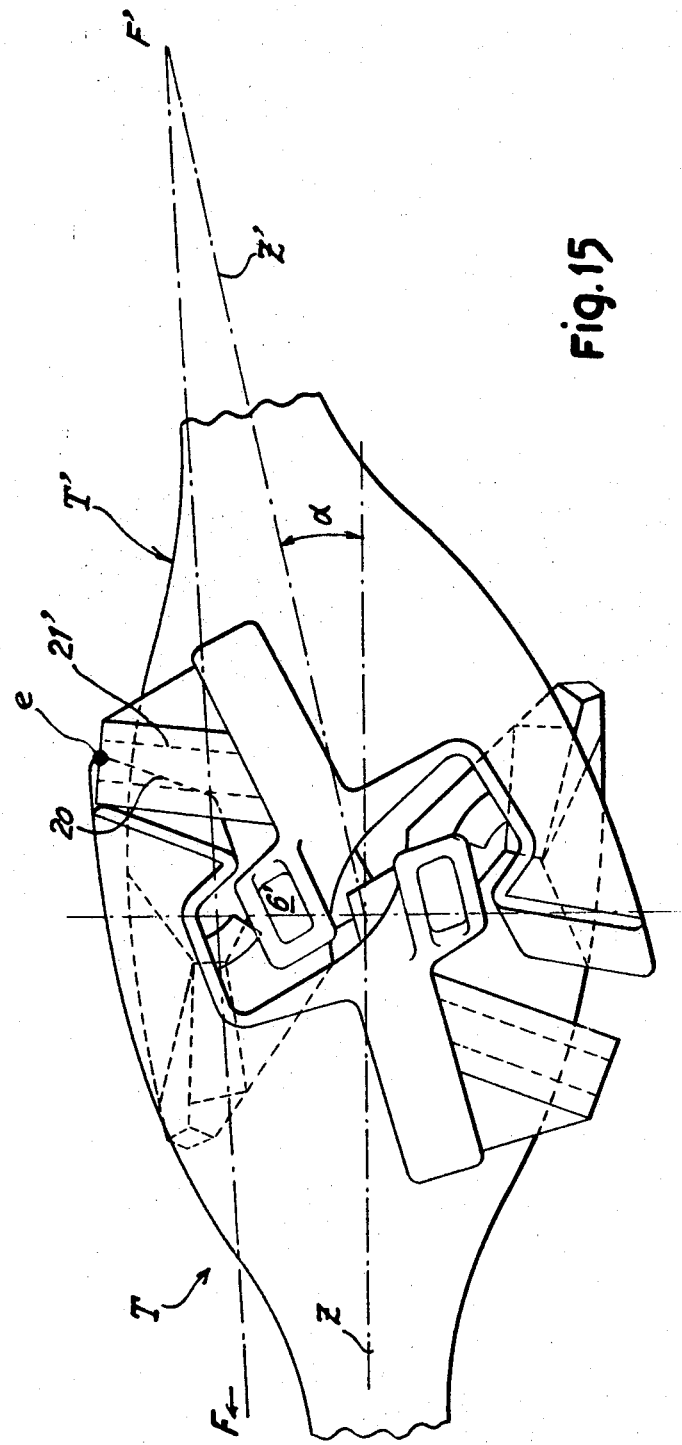

United States Patent Office 3,392,850
Patented July 16, 1968

3,392,850
AUTOMATIC COUPLER HEADS OF REDUCED
HEIGHT FOR RAILWAY VEHICLES
Guy Valleteau de Moulliac, Argenteuil, France, assignor
to Societe Generale Isothermos, Argenteuil, Val-de-Oise,
France, a company of France
Filed Apr. 19, 1966, Ser. No. 543,747
Claims priority, application France, Apr. 22, 1965,
14,193
3 Claims. (Cl. 213—100)

ABSTRACT OF THE DISCLOSURE

Coupler head has on its front face large hook-shaped jaw, small prism-shaped jaw, and lateral guide horn protruding forwardly from below small jaw. Horn and region of head below large jaw formed with horizontal rigidifying surfaces and sloping take-up surfaces. Appendage above horn and to rear of small jaw has vertical take-up surface cooperable with vertical take-up surface on large jaw. Appendage and large jaw may have horizontal rigidifying surfaces above their vertical take-up surfaces, and appendage and large jaw may have sloping take-up surfaces above their horizontal rigidifying surfaces.

The present invention relates to automatic coupler heads with central buffer for railway vehicles of the type which on the front face have a hook-shaped large jaw and a prism-shaped small jaw.

In order to couple two vehicles, the vehicles are each provided with such a coupler head, the two heads being mounted with respect to each other in such a manner that the large jaw of one head can couple with the small jaw of the other head and vice versa.

Coupler heads of this type, which are already known, comprise in addition, below the small jaw, a guide horn which protrudes laterally towards the end and towards the front and engages respectively below the large jaw of the coupled coupler head in order to prevent relative vertical displacement of the two heads.

In its present design, this type of coupler head makes it possible to obtain a horizontal range of action of ±250 mm., a vertical range of action of 150 mm., an angular take-up in the vertical plane of ±6°, and an angular take-up in the horizontal plane of ±12°, and is provided with means which assure the rigidity of the assembly produced by the combining of two heads.

The following description, read in conjunction with the accompanying drawings, will make it better understood, on basis of various embodiments of a non-limitative character, how the invention can be carried out in practice.

Figure 4:
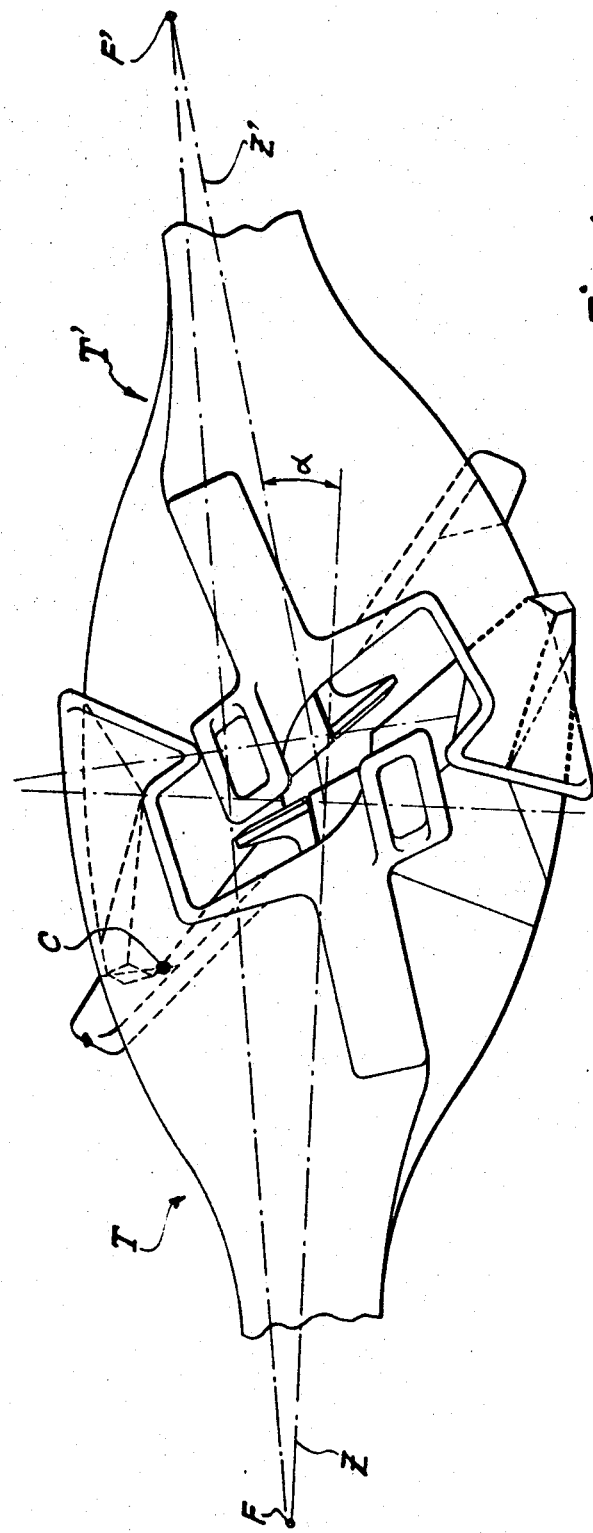
Figure 5:
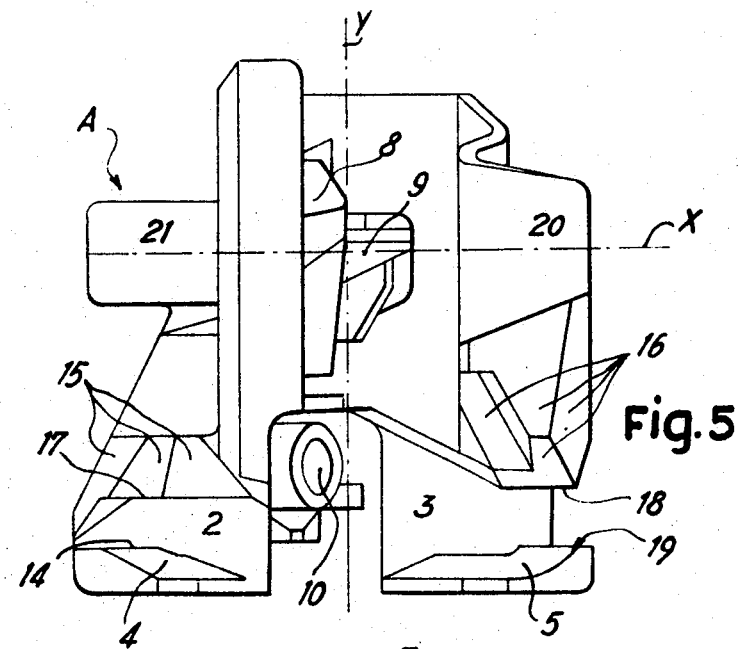
Figure 6:
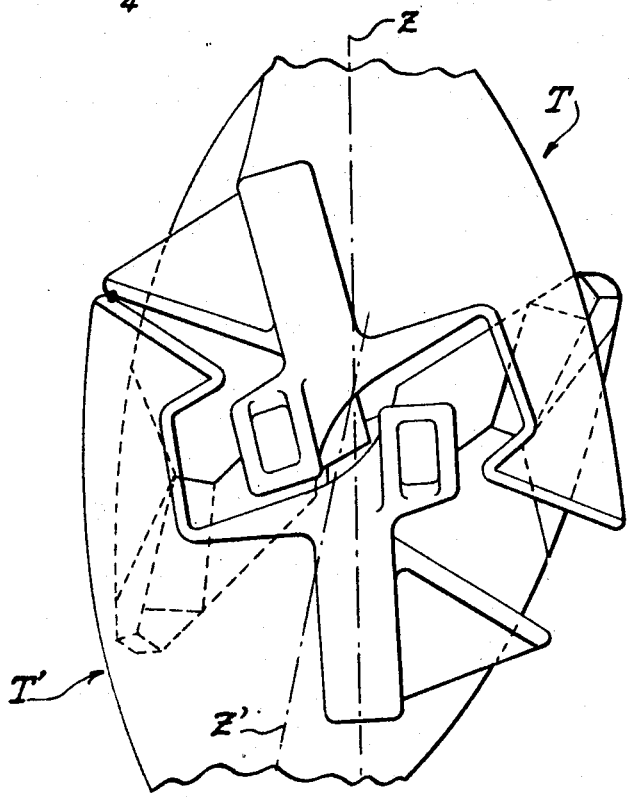
Figure 7:
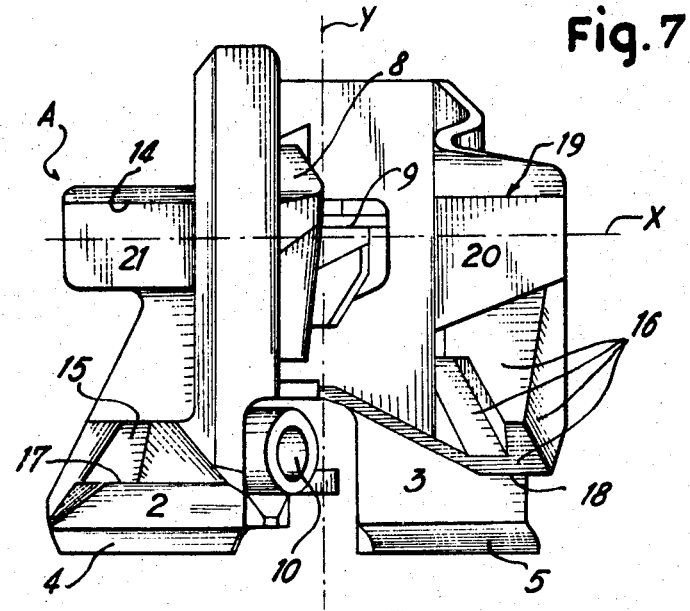
Figure 8:
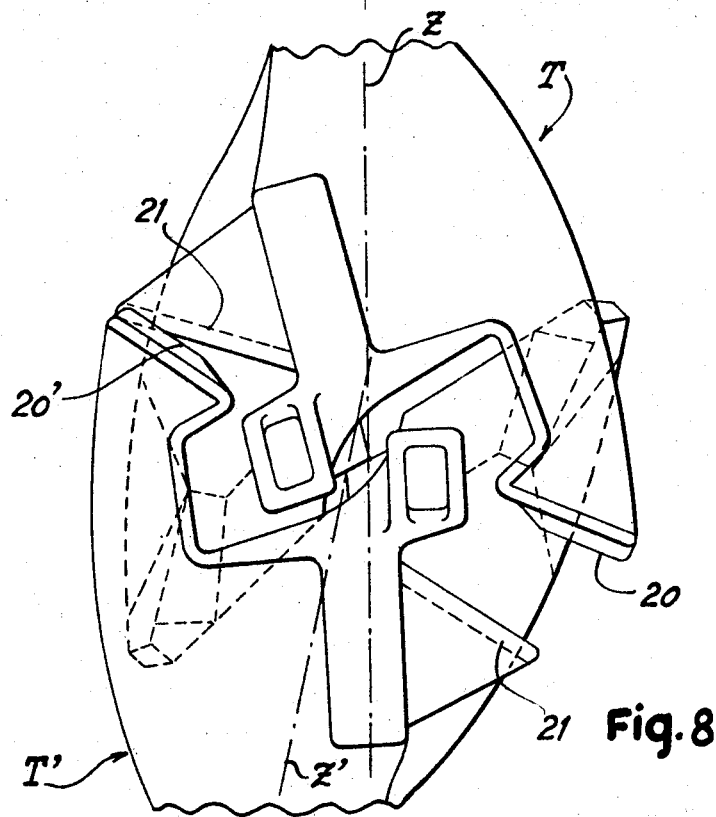
Figure 9:
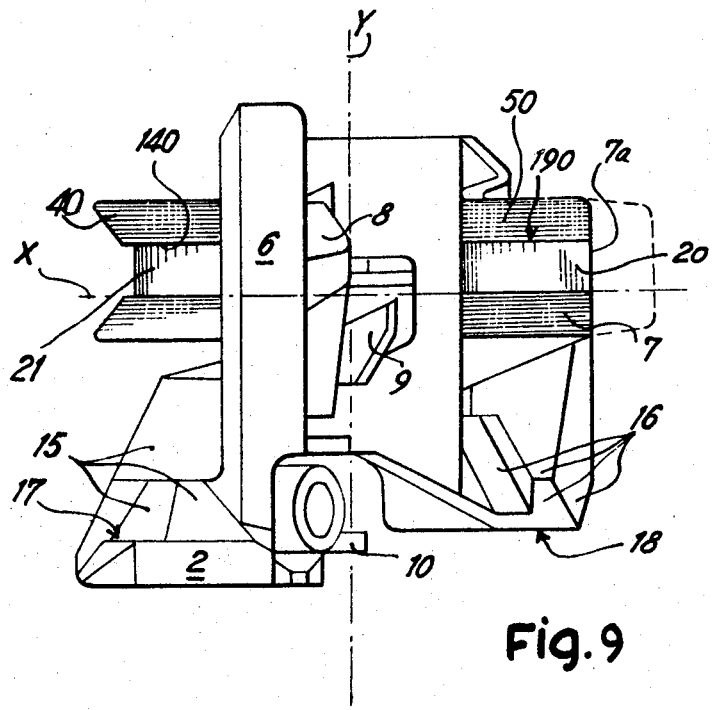
Figure 10:
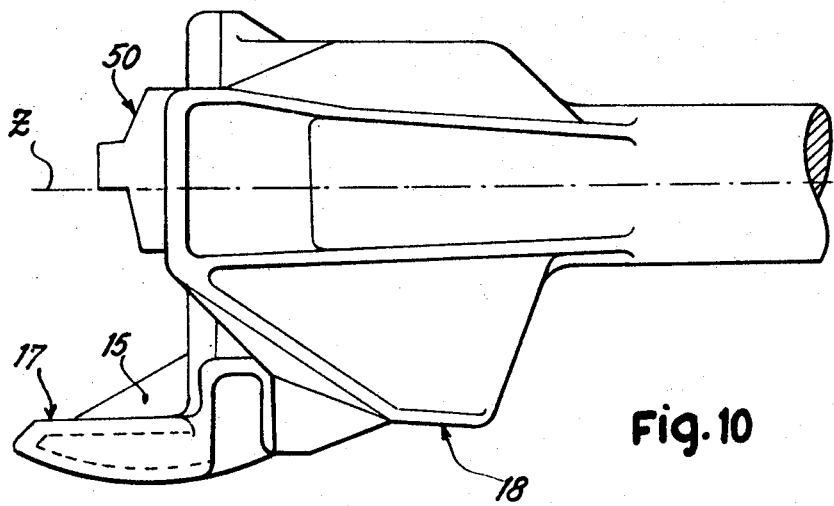
Figure 11:
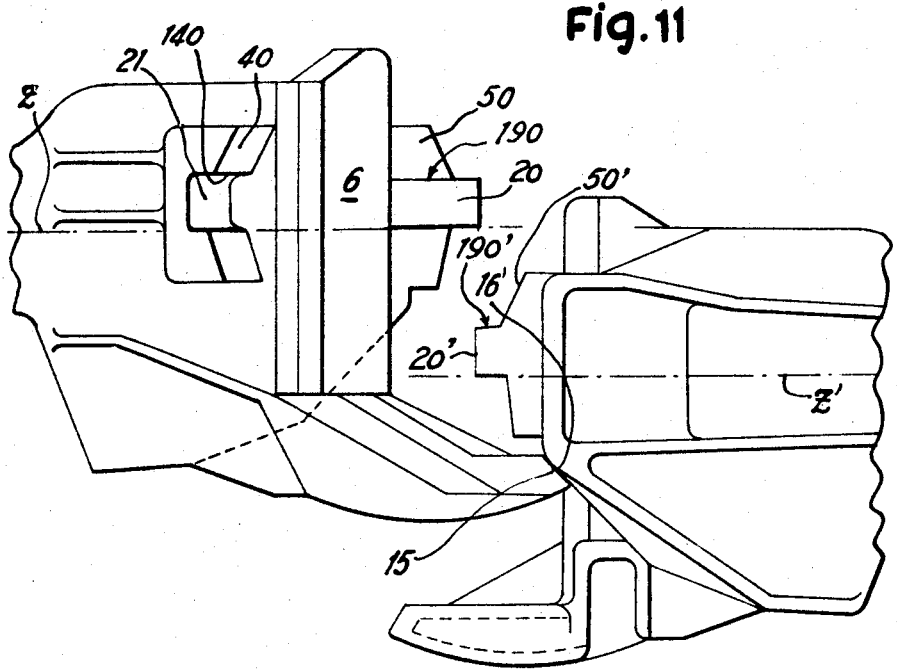
Figure 12:
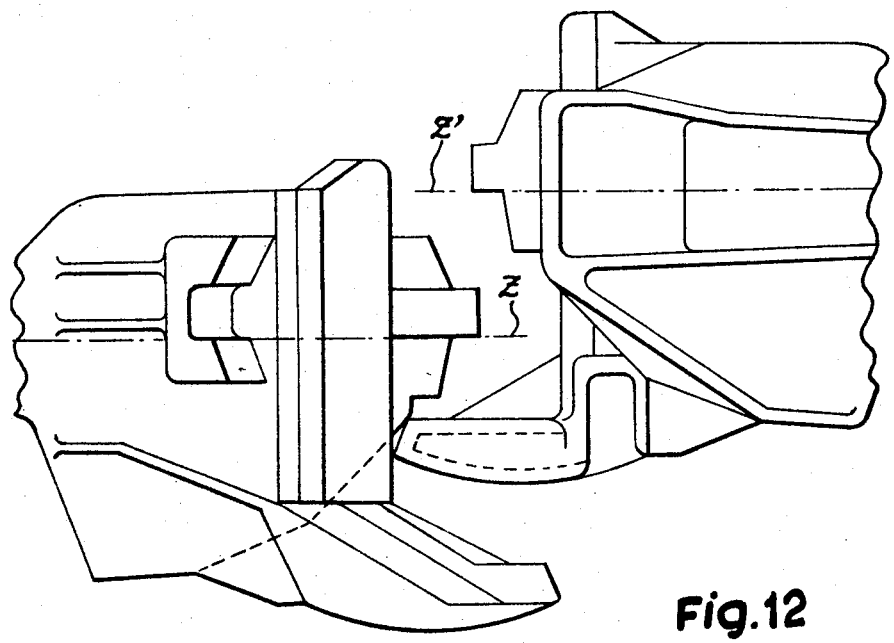
Figure 16:
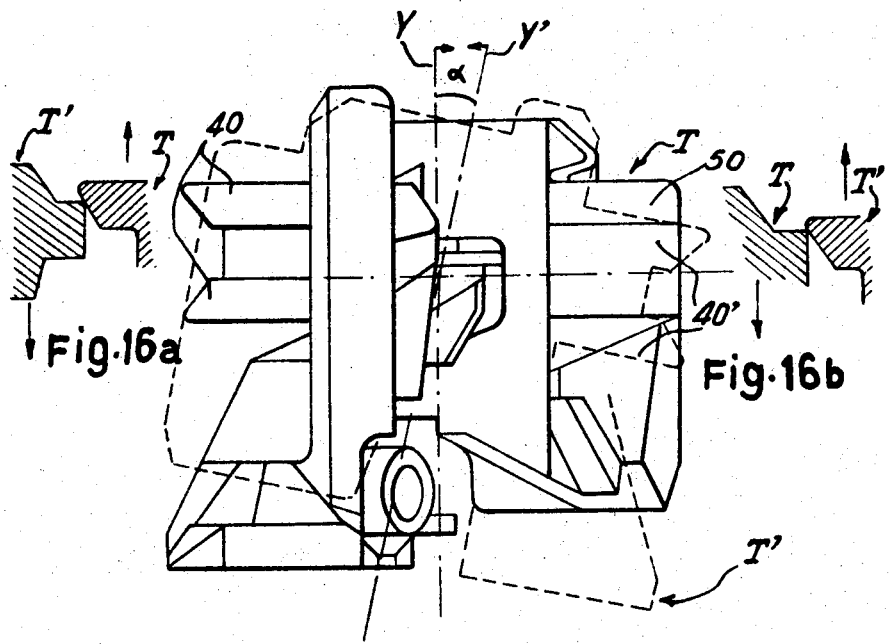
Figure 17:
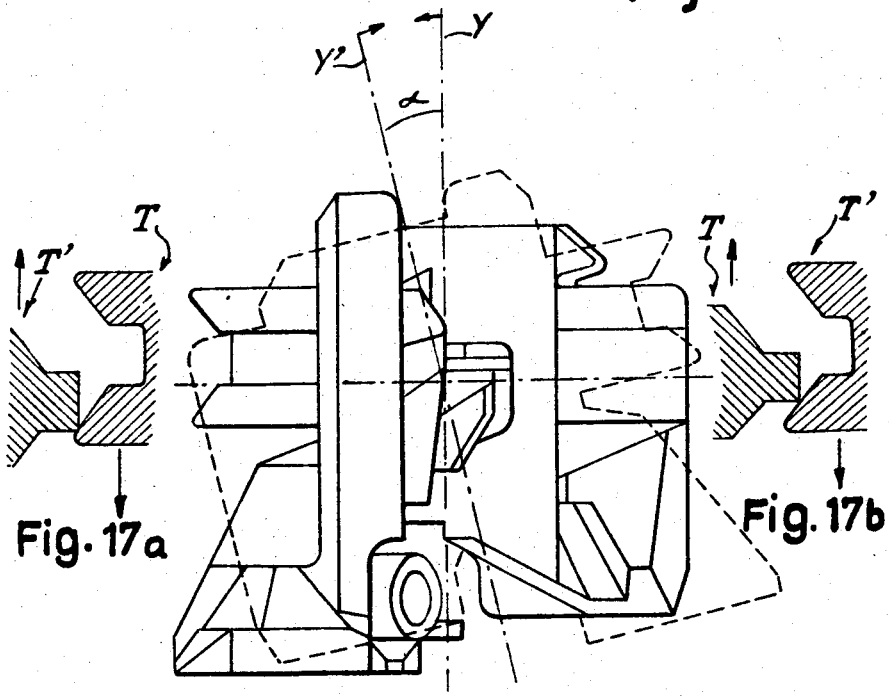
Figure 18:
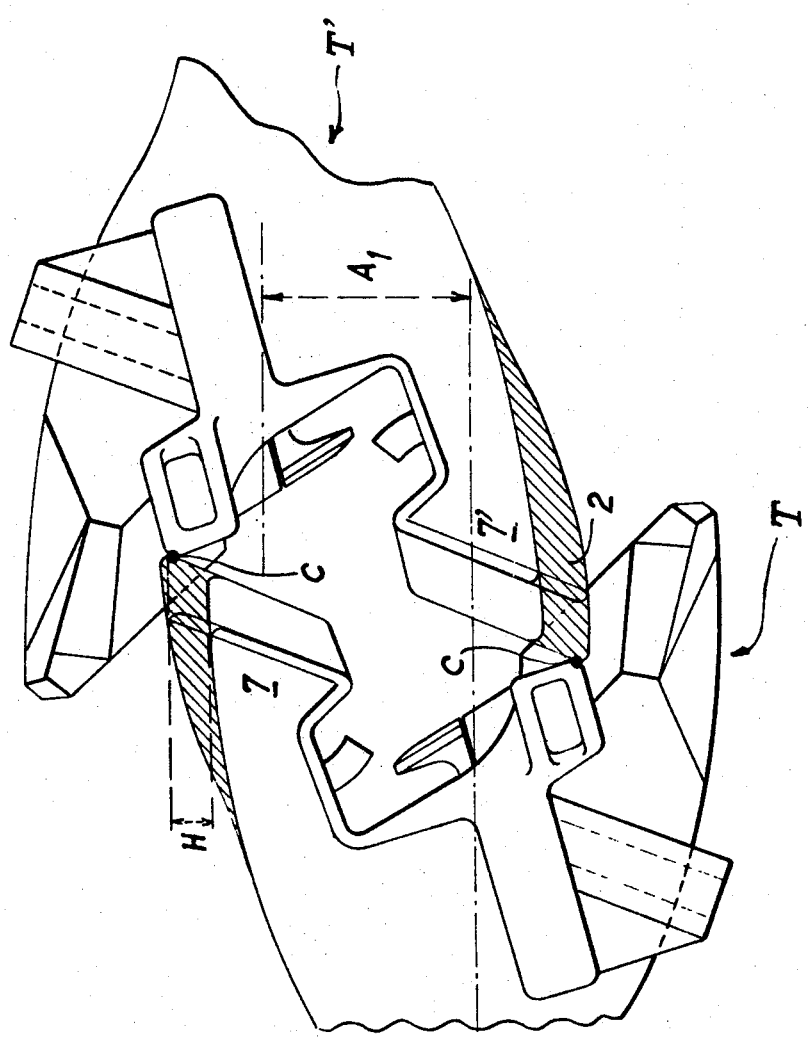
Figure 19:
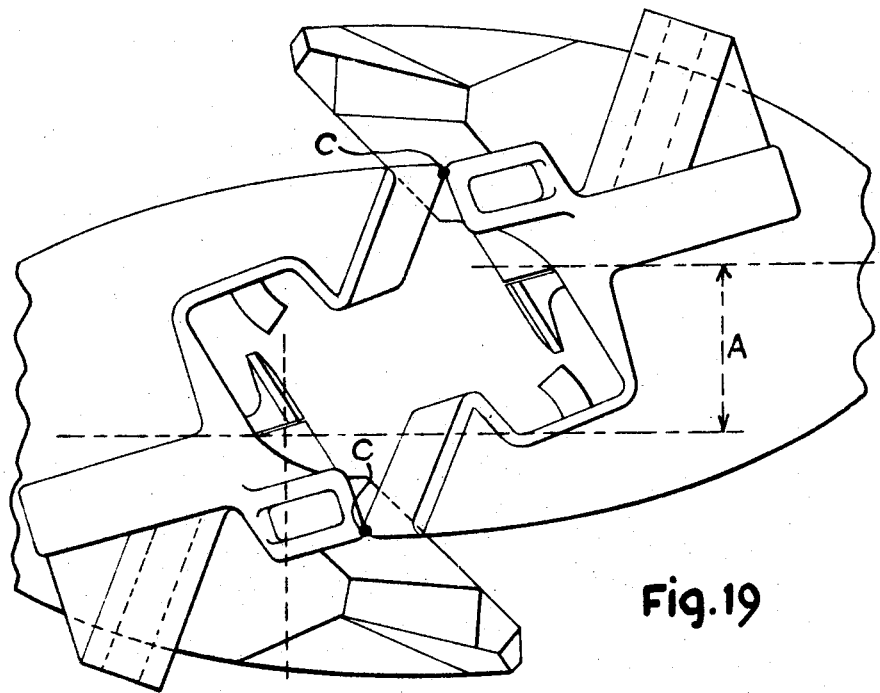
Figure 20:
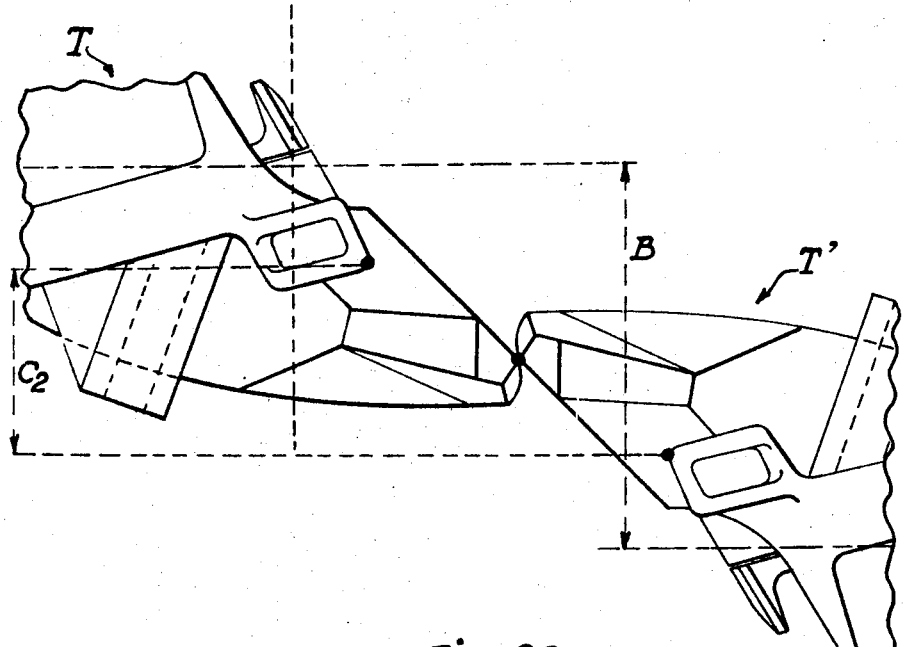
Figure 21:
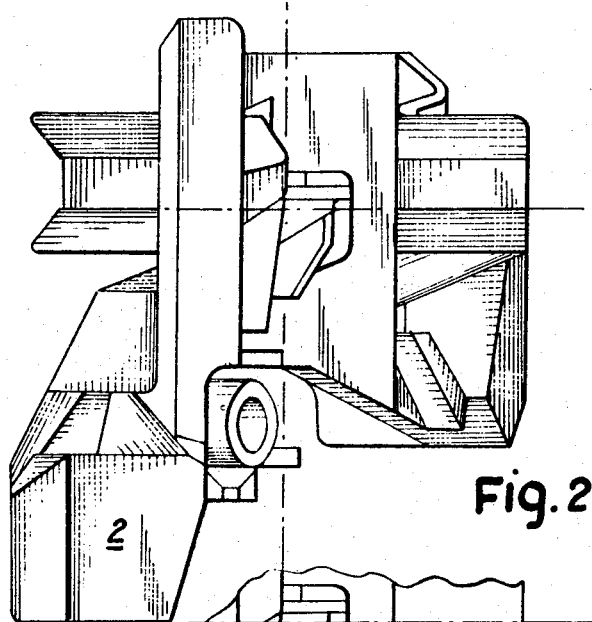
Figure 22:
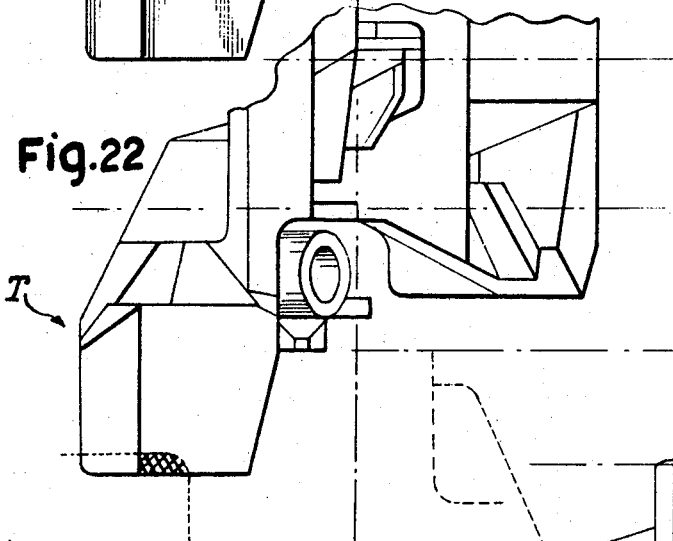
Figure 23:
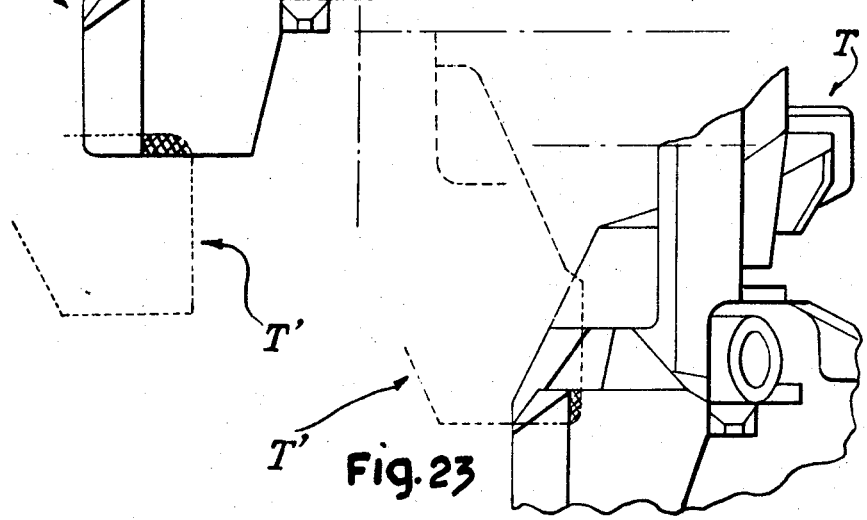

FIGURE 4 also shows in top view the two heads of a coupling in a cooperating position taking place just before the final coupling of the heads, in order to explain the conditions of angular take-up in the horizontal plane of the heads;

FIGURE 5 shows this head in front view in a front plane perpendicular to the axis of the arm;

FIGURE 6 shows in top view the two heads of a coupling in cooperating position;

FIGURES 7 and 8 relate to a variant of the head of FIGURES 5 and 6 in which the rigidifying means are raised above the axis of the head;

FIGURE 7 shows this head in face view;

FIGURE 8 shows in top view the two heads of a coupling in cooperating position;

FIGURE 9 shows this head in front view in a front plane perpendicular to the axis of the arm;

FIGURE 10 shows it in profile in a plane parallel to said axis;

FIGURES 11 and 12 show the profile of the two heads of a coupling in accordance with this variant, seen in different positions of cooperation, in order to explain the vertical range of action of the coupling;

FIGURES 13 and 14 also show these two heads, but in top view, in different cooperating positions, in order to explain the horizontal range of action of the coupling;

FIGURE 15 shows in top view these two cooperating heads in order to explain the cooperation of the angular take-up means in the vertical plane with which the heads are provided;

FIGURES 16 and 17 show in front view, in different cooperating positions, the two heads of a coupling, the plane of view being located between the two heads, the head located in front of said plane being schematically shown in dot-dash lines; these figures, together with FIGURES 16a and 16b, and 17a and 17b, which show details thereof seen in section along a vertical plane perpendicular to the front plane, have been given in order to illustrate the cooperation of the angular take-up means in the vertical plane with which the heads are provided;

FIGURE 18 relates to a variant of the head of the embodiment of FIGURES 9 to 17; this variant is characterized by an increase in the width of the large hook-shaped jaw in order to increase the horizontal range of action of the coupling, and the figure shows in top view the two heads of a coupling in accordance with this variant in a limit position of cooperation;

FIGURES 19 and 20 which are to be compared with FIGURES 13 and 14 respectively, relate to another variant of the head of the embodiment of FIGURES 9 to 18, also directed at increasing the range of horizontal action;

FIGURES 21 to 23 relate to another variant of head in which the lateral horn of the head is provided at its front edge with a vertical wall equal to or greater than the range of vertical action;

FIGURE 21 shows this head in front view in a front plane perpendicular to the axis of the arm; and FIGURES 22 and 23 show in front view, in different cooperating positions, the two heads of a coupling in accordance with this variant, the plane of view being located between the two heads and the head located in front of said plane being shown only by the said vertical wall of the horn of said head, the figures being given to explain the vertical range of action.

In the different figures, the same reference numbers designate parts which are identical or exert equivalent functions. In these figures, the coupler head is represented alone or in cooperation with the other coupler head, and in the latter case the reference numbers which designate the different faces of the two heads are provided with a prime mark in the case of one of the two heads to distinguish the faces of one head from the corresponding faces of the other head.

The concepts of field of action and angular take-up are familiar to the man skilled in the art in question and thus they will be referred to below only as a matter of memorandum with reference to FIGURES 1 to 4, which relate to a coupling head of the known type to which reference has been made above.

The known coupling head which is shown in FIGURES 1 to 4 is provided in essence on its front face with a large jaw 7 of hook shape, a small jaw 6 of prism shape and a guide horn 2.

Reference numeral 3 designates in the figures the percussion face located below the large jaw and with which in certain cases the horn of the associated coupler head can come into contact.

The axes X, Y and Z represent respectively the horizontal and vertical diametral axes and the longitudinal axis of the arm which is rigidly connected with the head and by which the latter is fastened to the railway vehicle.

Assuming two railway vehicles to which coupler heads are pivoted, namely for instance a head 7 in the case of one vehicle and a head 7' in the case of the other vehicle, the coupling is effected by bringing together and connecting the two heads opposite each other; now the initial positions of these heads, which positions depend essentially on the relative positions of the vehicles to which the heads are pivoted, may be such that the longitudinal axes Z and Z' of the heads, at the start of the coupling maneuvers, are one above the other or one to the right of the other or one oblique with respect to the other in the horizontal plane, the two axes being possibly, of course, at the same time staggered and oblique with respect to each other.

The same is true of the axes X and X', and Y and Y' which can also be staggered and oblique with respect to each other.

A closer bringing together of the heads from their initial positions must be effected in such a manner as progressively to do away with these original staggers or obliquenesses, this cancelling being effected by the sliding of certain front surfaces of one head against corresponding surfaces of the other head when the two heads are pushed towards each other.

However, if originally the axes of the two heads are too staggered or too oblique with respect to each other, the slide surfaces do not meet and the coupling of the heads becomes impossible. The range of horizontal action corresponds precisely to the maximum initial stagger permissible in the horizontal plane of the axes Z and Z' (or the axes Y and Y').

The vertical range of action corresponds to the maximum permissible initial stagger in the vertical plane of the axes Z and Z' (or of the axes X and X').

The angular take-up in the horizontal plane corresponds to the maximum initial obliqueness permissible in the horizontal plane of the axes Z and Z'.

Finally, the angular take-up in the vertical plane corresponds to the maximum initial obliqueness permissible in the vertical plane of the axes X and X' (or the axes Y and Y').

The ranges of action are defined by certain limit contacts between the corresponding surfaces of the two heads of a coupler.

Figure 3:
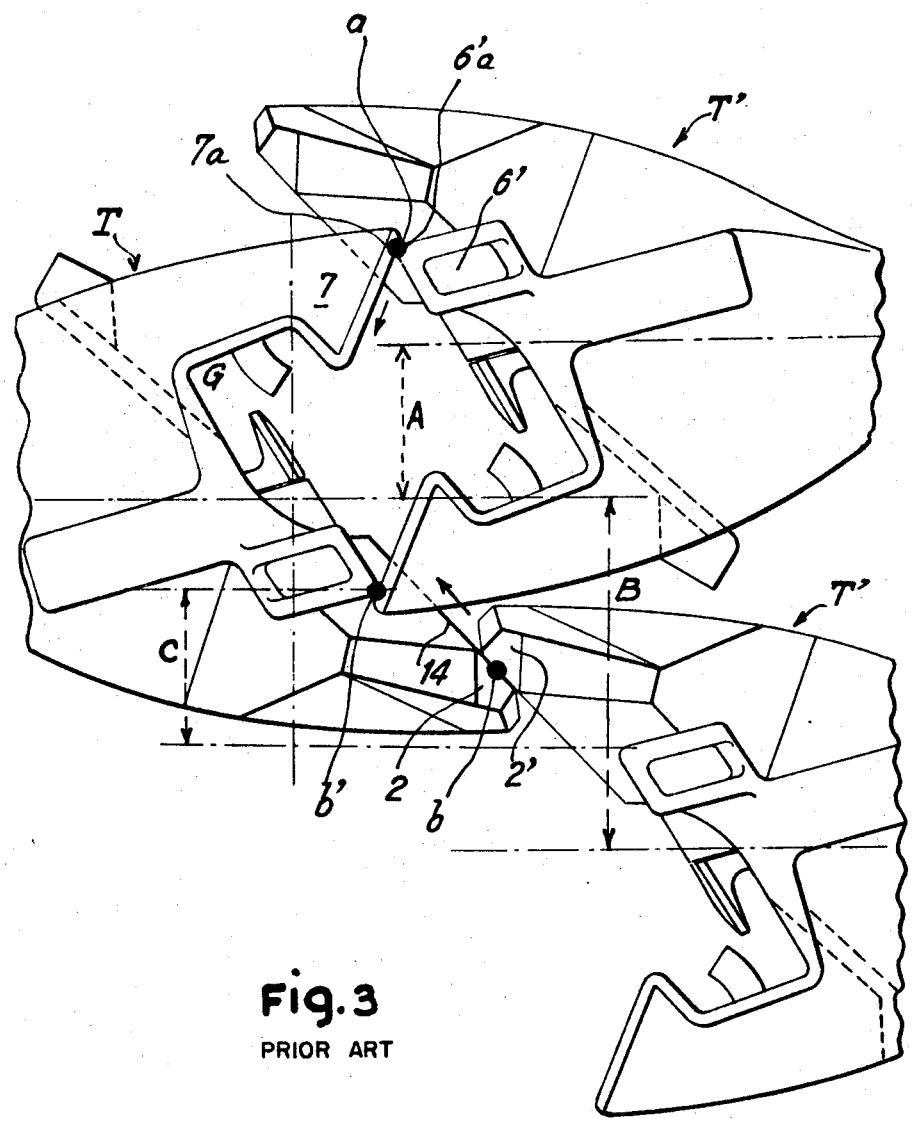
FIGURE 3 shows a top view of the two heads of a coupler in two extreme cooperating positions, in order to explain the range of horizontal action of the coupling.

In FIGURE 3, for instance, which shows in top view a coupler head designated generally by the letter T and the other head of the coupler T' which is to be coupled with the first head, the two heads have been shown in two limit relative positions, one in which the contact of the heads would start in the region marked $a$ by contact of the front part 7a of the large jaw 7 of the head T and of the front portion 6'a of the small jaw 6' of the head T', and the other in which the contact of the heads would start in the region marked $b$ by contact of the horns 2 and 2' of the two heads.

Assuming that the contact of the two heads takes place initially at $a$, the further slipping of the jaw 6' against the jaw 7 in the direction indicated by the arrow finally brings the jaw 6' into the space G which delimits the large jaw 7, which condition corresponds to a good coupling of the heads.

Assuming on the other hand that the contact of the two heads takes place initially at $b$, the further sliding of the horn 2' along the horn 2 in the direction indicated by the arrows, makes it possible to obtain finally the same result.

It will be understood that the contacts $a$ and $b$ are actually "limit" contacts since if the jaw 6' were initially further to the right of the jaw 7 (that is to say higher in the drawing of FIGURE 3) or if the horn 2' were initially more to the left of the horn 2 (that is to say lower in the drawing), the coupling of the two heads could no longer be effected, any further moving together of the latter causing the head T' to pass to the right or to the left of the head T.

The contact of the heads at $a$ corresponds to a stagger A of the axes Z and Z' of these heads while the contact of the heads at $b$ corresponds to a stagger B of said axes.

The total horizontal range of action is, therefore, defined by the distance $A+B$.

It can be noted (FIGURE 3) that the contribution of the horns of the heads to this distance is increased to the value of C since in the absence of said horns the limit contact would not take place at $b$ but at $b'$.

Figure 1:
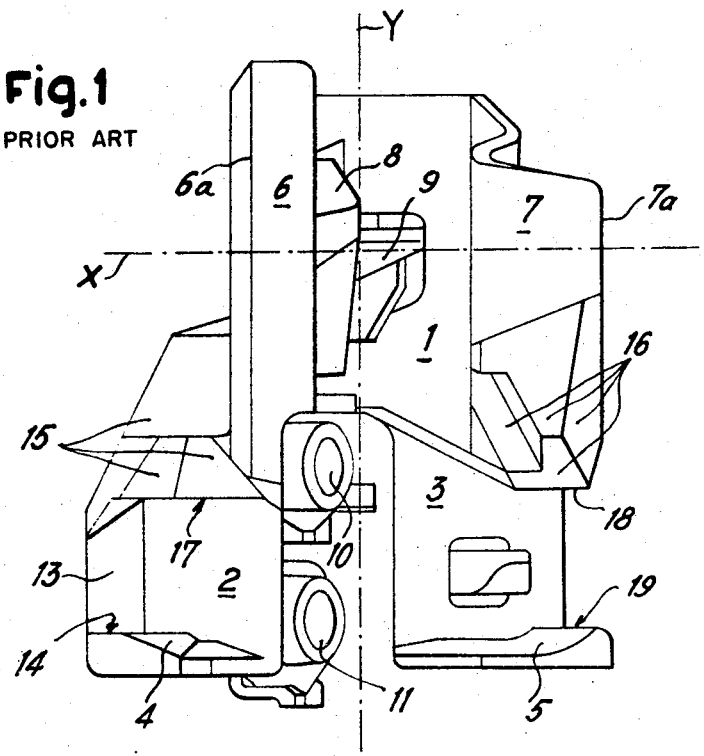
FIGURE 1 shows this head in a front plane perpendicular to the axis of the arm of the head.
Figure 2:
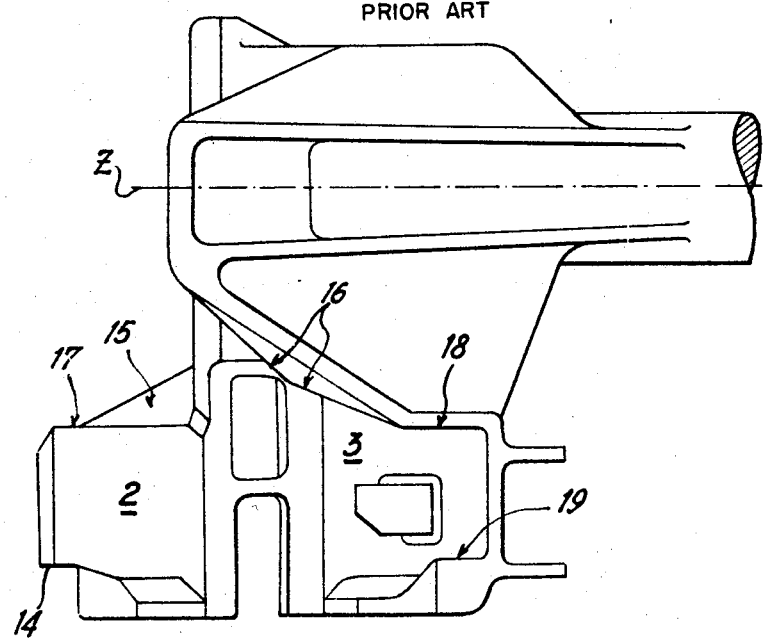
FIGURE 2 shows the head in a profile view along a plane parallel to the axis of the arm.

Similar considerations, but this time in the vertical range, lead to the "range of vertical action" of such a coupler head being defined by the difference in level of the inclined surfaces 16 of the jaw 7 and the corresponding inclined surfaces 15 of the horn (FIGURES 1 and 2).

In the case of an initial angular stagger in the horizontal plane of the axes Z and Z' of the two heads T and T' of a coupling (FIGURE 4), these two heads being pivoted respectively at F and at F' to their respective vehicles, it is necessary that the point of contact $c$ of the horn 2 of the head T' on the percussion face 3 of the head T be always on the outside of the imaginary line FF' joining the pivot axes of the two couplings so as to create respectively a take-up torque which tends to realign the heads.

This leads to the consideration that the angle formed initially by the axes Z and Z' must be at most 12° in the case of the coupler heads of the type in question.

In the case of an initial angular stagger in the vertical plane of the two axes X and X' (or Y and Y'), an oblique surface 4 on the bottom of the horn 2 and an oblique surface 5 on the bottom of the percussion face 3 (FIGURE 1), these surfaces being one oblique forward and the other oblique rearward, they must be able to cooperate with corresponding surfaces of the other coupler head (the surface 4 of one head cooperating with the surface 5 of the other head and vice versa) in order to develop a straightening torque and reestablish parallelism of the axes.

Finally, the rigidity of the resultant coupling can be obtained by engagement of the face 17 of the horn 2 of one head with the face 18 located on the lower part of the large jaw of the coupled head and faces 14 located on the lower portion of the horn 2 of one head with the face 19 located at the bottom portion of the percussion face 3 of the coupled head.

The concept of these known coupler heads, which have been described above, implies below the axis X or Z or the coupler arm an excessive height of head of about 410/450 mm.

This height presents the drawback, in particular, during the so-called "transition" period (during which the cars which are provided with an automatic coupler of this type should be able to be coupled with cars provided with the present hook, the latter being equipped with the Unitendeur transition apparatus or apparatus of any other system), of making it very difficult to carry out different operations which have to be performed manually during the coupling, such as the connecting and disconnecting between coupling and transition apparatus on each side of the car (space set aside for this purpose—Berne rectangle—free coupling space) and as the connecting of the coupling hoses of the brake pipe (connecting and disconnecting—opening and closing of the cut-off cocks) on each side of the cars.

The object of the present invention is to define an automatic coupler head which substantially has the same characteristics of range of action, angular take-up and rigidity as the head described, while reducing this size of 410/450 mm. to a size which need not exceed 280 mm. below the axis, which affords the two-fold advantage of decreasing the space taken up by and the weight of the head while guaranteeing the connecting of the brake pipe hoses during the transition period.

In accordance with a first characteristic of the coupler head of the invention, the means used to obtain the angular take-up in the horizontal plane are located above the upper level of the horn of the head.

In accordance with another feature of the invention, to be combined with the first, the means with which the head is provided to effect the angular take-up in the vertical plane or torsional take-up are also located at a level located above the upper level of the horn.

In accordance with another characteristic of the invention, the means for making the head rigid are also raised above the upper level of the horn.

In one particularly advantageous embodiment, the means which serve to effect the angular take-up in the horizontal plane, the angular take-up in the vertical plane, and assure rigidity of the coupling, comprise different surfaces of an appendix located above the horn and to the rear of the small prism jaw.

FIGURES 5 and 6 relate to an embodiment of the coupler head of the invention, characterized by the fact that the angular take-up means in the horizontal plane are raised above the upper level of the horn.

FIGURE 5 shows in front view a coupler head in accordance with the invention, which is characterized by the presence of an appendage A located above the horn of the head and to the rear of its small prism jaw. This appendage A has on its front face a surface 21 which is intended to cooperate with a surface 20′ located on the front face of the large jaw of the associated head. This associated head is not seen in FIGURE 5, but on this figure there is shown the face 20 of the head illustrated which is equivalent to the face 20′ of the associated head. The faces 21 and 20 are intended to cooperate with the faces 20′ and 21′ respectively of the associated head to assure the angular take-up in the horizontal plane.

The presence of these faces above the horn makes it possible to reduce the distance of the levels designated by the reference numbers 14 and 17 as can be seen by comparing FIGURES 1 and 5. Therefore, it results that the angular take-up means in the vertical plane and the means for rigidifying the coupler heads are raised with respect to the means corresponding to known heads of the type shown in FIGURE 1. In practice, the angular take-up in the vertical plane is obtained by the known play of the surface 4 of one head with the face 5′ of the coupled head and vice versa, and the rigidifying by the known play of the faces 17 and 14 of one head with the faces 18′ and 19′ respectively of the coupled head.

FIGURES 7 and 8 relate to a variant embodiment of the head of FIGURE 5 which is characterized by the fact that the rigidifying means of the head are also raised above the horn, these means comprising, for instance, an oblique face 14 on the front face of the appendage A and the corresponding face 19 on the large jaw, these two faces cooperating respectively with the faces 19′ and 14′ of the associated head. The rigidifying is furthermore assured by the contact of the face 17 of the horn 2 of one head with the face 18′ located under the large jaw 7′ of the other head.

In this embodiment, the range of vertical action is defined by the cooperation of the surfaces 15 of the horn of one head with the surfaces 16′ located under the jaw of the associated head, and vice versa.

The angular take-up in the vertical plane is assured by the end of stroke engaged with contact of the oblique face 4 of the horn 2 of one head with the oblique face 5′ located below the large jaw of the coupled head, and vice versa.

This variant of head is particularly interesting due to the fact that it can be preserved permanently, and without subsequent change, that it makes it possible to retain in full the locking mechanisms 8 and 9 (FIGURE 1) of the heads and that it furthermore makes it possible to do away with the upper coupler 10 (FIGURE 1) and to retain unchanged the entire advancing system of the air coupler. Furthermore, such a variant offers the advantage of fully limiting the head to a size of 280 mm. below the axis X, thus permitting in the future the introduction of a second air coupler and electric contacts without increasing the space taken up by the coupling.

FIGURES 9 to 17 relate to another embodiment of the coupler head of the invention, said head being characterized by the elimination of the vertical walls of the horn and the percussion face located under the large hook-shaped jaw, the angular return means in vertical plane and in horizontal plane as well as the rigidifying means being raised above the upper level of the horn.

In the embodiment of the coupler head which forms the subject matter of FIGURES 9 to 17, the angular take-up means in the vertical plane are also raised above the horn.

As a matter of fact, this embodiment differs significantly from the known head described with respect to FIGURES 1 to 4 by the special structure of its horn which is without vertical wall 13, faces 4 and 5, and face 14; furthermore, this head does not have a percussion face 3 under its large jaw nor surfaces such as the surfaces 5 and 19 of the head of FIGURE 1.

The first interesting consequence of these characteristics resides in the fact that it is thus possible to reduce the height below the axis from 410/450 mm. to 280 mm., thus making it possible to effect without difficulty the coupling of the hoses of the brake pipe during the transition period and, furthermore, to decrease the space taken up by, and the weight of, the automatic coupler head.

The vertical range of action (FIGURES 11 and 12) can be substantially 150 mm., the vertical staggers being compensated for in all directions of the coupling of the two coupler heads by the reciprocal action of the surfaces 15 of the guide horn forming a protrusion laterally and below the small jaw 6 of prism shape of one head on the surfaces 16 placed below the large jaw 7′ of the other head.

The horizontal range of action is defined on one side (FIGURE 13) by the contact $a$ of the advanced ends of the large jaw 7 of one head T and of the small jaw 6′ of the other head T′ of the coupling. This limit contact corresponds to a first limit stagger A of the Z and Z′ axes of these heads (FIGURE 13).

On the opposite side (FIGURE 14), the contact $d$ of the jaw 6 of the head T and of the horn 2′ of the head T′ corresponds to a second maximum stagger B admissible a priori between the axes Z and Z′.

In the embodiment of this transition head (FIGURE 9), the angular take-up in the horizontal plane is effected (FIGURE 15) by the contact $e$ of the front face 20 of the large jaw 7 of the head T on the face 21′ of the appendage located to the rear of the horn 2′ of the associated head T′; this contact must at all times be on the outside of the imaginary line FF′ connecting the pivot axes of the two couplings so as to create a take-up torque tending to realign the heads and thus permitting the engagement of the small jaw 6′ in the head T.

In accordance with the invention, the angular take-up in the vertical plane is obtained by the interaction of the inclined faces 40 of one head on the inclined faces 50′ located on the front face of the large jaw of the coupled head (FIGURES 9, 10, 16 and 17).

In FIGURES 16 and 17, the heads T and T′ which cooperate to form a coupling are shown in solid lines and in dashed lines respectively. In the showing provided in these figures, the respective positions of the two heads are such that their axes Y and Y′ are oblique with respect to each other and form an angle $\alpha$ with each other.

FIGURES 16a and 16b and FIGURES 17a and 17b which are sections in planes perpendicular to the planes of FIGURES 16 and 17 show schematically how the surfaces 40 of one head T cooperate with the surfaces 50' of the coupled head T', and vice versa, the arrows indicating in these figures the directions of displacement of these surfaces when they slide on each other until the heads have arrived in proper coupling positions.

The rigidity is obtained on the one hand as in the known coupler head by the engagement (at the end of the coupling stroke of the coupler heads) of the face 17 of the horn 2 of one head and the face 18' located at the lower part of the large jaw 7' of the associated head, and vice versa (FIGURES 9 and 10).

In accordance with one feature of the invention, the rigidifying means, which were constituted by the faces 14 and 19 located on the side horn 2 and the percussion face 3 of the known head (FIGURE 1) are raised in the axis of the arm, namely they become face 140 on the appendage located at the rear of the small prism jaw 6 and face 190 on the front face of the large jaw 7 (FIGURE 9).

FIGURE 18 relates to a variant embodiment of the coupler head of the invention, characterized by an increase in the width of the large hook-shaped jaw in order to increase the value of the horizontal range of action of the head.

In FIGURE 18, the widened portion of this jaw has been represented by a hatched area; it can be seen that the portion of the horizontal range of action which has the value A in the embodiment of FIGURE 13 assumes, in this variant, the value $A_1$, which is equal to the value A plus the value H representing the increase in width of the large jaw of the head.

FIGURES 19 and 20 relate to another variant which also makes it possible to increase the horizontal range of action; FIGURE 19 is identical to FIGURE 9 and is given only to accompany FIGURE 10 of which it forms the logical complement, but FIGURE 20 shows that in accordance with this embodiment, one of the limit contacts of the heads T and T' takes place between the ends of the horns of said heads, which is equivalent to increasing the value $C_2$ of the horizontal range of action.

It is, therefore, possible to use any of these solutions to increase the horizontal range of action on the one side or the other.

The variants shown in FIGURES 19 and 20 appear most interesting, since they make it possible to obtain the maximum horizontal range of action without increasing the width of the large jaw.

In another embodiment which forms the subject matter of FIGURES 21 to 23, one can, in order to obtain the vertical range of action, provide the lateral horn at its front edge with a vertical wall of a height equal to or greater than the value of said range (FIGURE 21).

FIGURES 22 and 23 show how in this case the high and low portions of the two heads T and T' of a coupling can cooperate, the head located in front of the plane of the drawing being represented only very partially in dashed lines. In these figures, the hatched areas designate the limit contact zones of the two coupler heads.

Of course, the various details described above can be combined together; and it goes without saying that the numerical values which have been given for the coupler heads in accordance with the invention are preferred but not limitative values, and that one can change same without going beyond the scope of the invention.

What is claimed is:

1. An automatic coupler head for a railway vehicle comprising: on the front face of the head a large hook-shaped coupling jaw, a small prism-shaped coupling jaw, and a lateral guide horn protruding forwardly from below said small jaw, said horn and the region of the head below said large jaw being formed with horizontal rigidifying surfaces, and with sloping take-up surfaces for effecting angular take-up in a vertical plane, and an appendage above said horn and to the rear of said small jaw, said appendage having on its front face a vertical take-up surface, and said large jaw being formed with a vertical take-up surface adapted to cooperate with the vertical take-up surface of said appendage for effecting angular take-up in a horizontal plane.

2. A coupler head according to claim 1 wherein said appendage has a horizontal rigidifying surface above its vertical take-up surface, and wherein said large jaw has a corresponding horizontal rigidifying surface above its vertical take-up surface.

3. A coupler head according to claim 2 wherein said appendage is provided with a sloping take-up surface above its horizontal rigidifying surface, and said large jaw is provided with a corresponding sloping take-up surface above its horizontal rigidifying surface.

References Cited

UNITED STATES PATENTS

| 2,825,473 | 3/1958 | Metzger | 213—100 |
|---|---|---|---|
| 3,164,266 | 1/1965 | DePenti et al. | 213—100 |

FOREIGN PATENTS

| 1,279,881 | 11/1961 | France. |
|---|---|---|
| 1,385,829 | 12/1964 | France. |

DRAYTON E. HOFFMAN, *Primary Examiner.*